United States Patent
Fukuoka et al.

(10) Patent No.: US 9,318,887 B2
(45) Date of Patent: Apr. 19, 2016

(54) RESIN MOLDED BUSHING AND SWITCHGEAR

(71) Applicants: Takayuki Fukuoka, Tokyo (JP); Hiroshi Isoya, Tokyo (JP); Tadahiro Yoshida, Tokyo (JP); Yoshiharu Irie, Kobe (JP)

(72) Inventors: Takayuki Fukuoka, Tokyo (JP); Hiroshi Isoya, Tokyo (JP); Tadahiro Yoshida, Tokyo (JP); Yoshiharu Irie, Kobe (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/428,833

(22) PCT Filed: Feb. 28, 2013

(86) PCT No.: PCT/JP2013/055406
§ 371 (c)(1),
(2) Date: Mar. 17, 2015

(87) PCT Pub. No.: WO2014/045611
PCT Pub. Date: Mar. 27, 2014

(65) Prior Publication Data
US 2015/0244158 A1    Aug. 27, 2015

(30) Foreign Application Priority Data

Sep. 18, 2012 (JP) ................. 2012-204219

(51) Int. Cl.
*H02G 3/22* (2006.01)
*H01B 17/26* (2006.01)
(Continued)

(52) U.S. Cl.
CPC ............... *H02G 3/22* (2013.01); *H01B 17/26* (2013.01); *H01H 33/02* (2013.01); *H01H 33/66207* (2013.01); *H01H 33/24* (2013.01); *H01H 33/6606* (2013.01); *H01H 2033/6665* (2013.01)

(58) Field of Classification Search
CPC ............. H01H 9/0044; H01H 33/021; H01H 33/6606; H01H 33/53; H02G 3/22; H01B 17/26; H01B 17/00; H01B 19/00; H02B 13/00
USPC ............... 218/97, 134, 155, 37, 139; 361/600
See application file for complete search history.

(56) References Cited

U.S. PATENT DOCUMENTS

2002/0051336 A1* 5/2002 Shichida .............. H02B 13/035 361/618
2003/0112569 A1* 6/2003 Kato .................. H02B 13/0356 361/93.1

(Continued)

FOREIGN PATENT DOCUMENTS

CN  101620948 A  1/2010
JP  49-53249 U  5/1974

(Continued)

OTHER PUBLICATIONS

Translated Abstract Only (Orig. doc. published Jan. 22, 1992).*

(Continued)

*Primary Examiner* — Renee Luebke
*Assistant Examiner* — William Bolton
(74) *Attorney, Agent, or Firm* — Buchanan Ingersoll & Rooney PC

(57) ABSTRACT

An object of the present invention is to obtain a resin molded bushing which can easily perform positioning of an electric field relaxation shield in a switchgear. The resin molded bushing includes: an electric field relaxation shield which concentrically surrounds the outer periphery of an internal conductor made of conductor; a cast resin which covers the internal conductor and the electric field relaxation shield; and an elastic member which is disposed on the outer periphery of the electric field relaxation shield and is embedded in the cast resin. The height of the elastic member is equal to the thickness of the cast resin which covers the electric field relaxation shield.

8 Claims, 4 Drawing Sheets

(51) Int. Cl.
*H01H 33/02* (2006.01)
*H01H 33/662* (2006.01)
*H01H 33/24* (2006.01)
*H01H 33/66* (2006.01)
*H01H 33/666* (2006.01)

(56) References Cited

U.S. PATENT DOCUMENTS

2010/0000973 A1 1/2010 Tsuchiya et al.
2012/0178293 A1* 7/2012 Mattozzi ............... H02G 15/107
439/607.01

FOREIGN PATENT DOCUMENTS

| JP | 56-127684 U | 3/1983 |
| JP | 59-143213 A | 8/1984 |
| JP | 62-143321 A | 6/1987 |
| JP | 62-124080 U | 8/1987 |
| JP | 63-190221 A | 8/1988 |
| JP | 4-17220 A | 1/1992 |
| JP | 2010-178526 A | 8/2010 |

OTHER PUBLICATIONS

International Search Report (PCT/ISA/210) mailed on Apr. 9, 2013, by the Japanese Patent Office as the International Searching Authority for International Application No. PCT/JP2013/055406.

Written Opinion (PCT/ISA/237) mailed on Apr. 9, 2013, by the Japanese Patent Office as the International Searching Authority for International Application No. PCT/JP2013/055406.

First Office Action dated Nov. 5, 2015 issued in the corresponding Chinese Patent Application No. 201380048349.6 and English translation (8 pages).

* cited by examiner

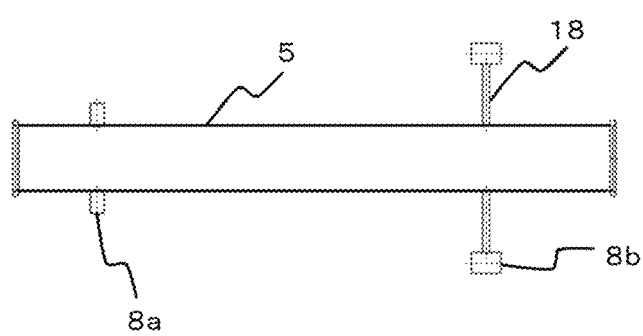
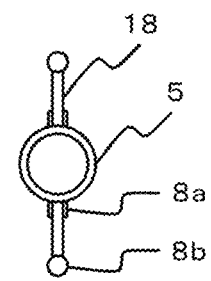
Fig. 3A    Fig. 3B
Fig. 4
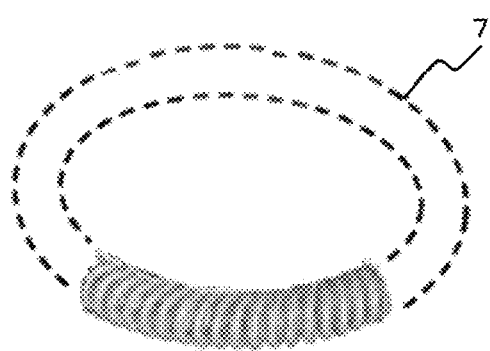

Fig. 7
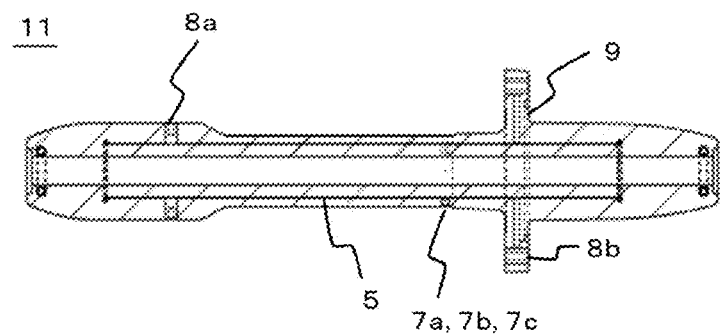
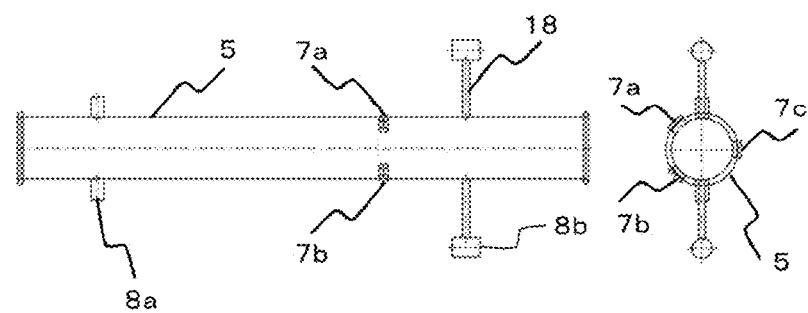
Fig. 8A   Fig. 8B

RESIN MOLDED BUSHING AND SWITCHGEAR

TECHNICAL FIELD

The present invention relates to a resin molded bushing and a switchgear and, more particularly, relates to the structure of positioning between an internal conductor and an electric field relaxation shield in a resin molded bushing equipped in a switchgear.

BACKGROUND ART

A switchgear is equipped with a resin molded bushing. The resin molded bushing includes an internal conductor (metal conductor) and a cylindrical electric field relaxation shield disposed around the internal conductor. In a method of positioning between the internal conductor and the electric field relaxation shield, there are known a method of mounting an embedded metal on an electric field relaxation shield and fixing by the embedded metal in a mold tool (for example, Patent Document 1), a method of providing a flange on the inner surface of a mold tool (for example, Patent Document 2), and the like.

There is also conceivable a method of fixing a plastic spacer made of the same material as a cast resin in the radial direction of an electric field relaxation shield. Radially extended fixing plates are provided at several places on the outer peripheral surface of the electric field relaxation shield to fix the axial direction of the electric field relaxation shield via intervening fixing plates and plastic spacers.

PRIOR ART DOCUMENT

Patent Document

Patent Document 1: Japanese Unexamined Utility Model Publication No. S59-143213
Patent Document 2: Japanese Unexamined Utility Model Publication No. S63-190221

SUMMARY OF THE INVENTION

Problems to be Solved by the Invention

When the whole length of the electric field relaxation shield is elongated, a fixing interval of the plastic spacers is also elongated; and accordingly, the longer the resin molded bushing is, the more a center deviation (coaxiality misalignment) between the internal conductor and the electric field relaxation shield is likely to be generated. In the case of applying plastic spacers to fixing the electric field relaxation shield, an issue is raised on the weakness of the plastic spacer for holding in the mold tool. When the resin molded bushing produces a center deviation in the electric field relaxation shield, the distribution of an electric field becomes non-uniform to generate a local electric field concentration.

In the case of fixing the electric field relaxation shield by the embedded metal and the plastic spacer, processing at the mounting position of the mold tool needs to be previously made; and accordingly, locating more fixing places is difficult. More particularly, in the case of fixing the electric field relaxation shield by the embedded metal, the embedded metal has to be fixed by bolts from the outside of the mold tool when the embedded metal is disposed on the electric field relaxation shield; and accordingly, there arises an extra work in assembling and disassembling of the mold tool.

The present invention has been made to solve the problem described above, and an object of the present invention is to obtain a resin molded bushing which can easily perform positioning between an electric field relaxation shield and an internal conductor.

Means for Solving the Problems

A resin molded bushing according to the present invention includes: an electric field relaxation shield which concentrically surrounds the outer periphery of an internal conductor made of conductor; a cast resin which covers the internal conductor and the electric field relaxation shield; and an elastic member which is disposed on the outer periphery of the electric field relaxation shield and is embedded in the cast resin. The height of the elastic member is equal to the thickness of the cast resin which covers the electric field relaxation shield.

Advantageous Effect of the Invention

The present invention exhibits the following effects. A center deviation can be prevented without increasing special processing to a mold tool, adjustment work in assembling of the mold tool, and extra disassembling work of the mold tool. Furthermore, a coil spring is merely disposed on the electric field relaxation shield, whereby mounting work can be made in a short time.

BRIEF DESCRIPTION OF THE DRAWINGS

FIG. 3 are a side view (FIG. 3A) and a front view (FIG. 3B) each showing the configuration of an electric field relaxation shield;
FIG. 4 is a perspective view showing a spiral ring for use in Embodiment 1 of the present invention;
FIG. 7 is a view showing the structure of a resin molded bushing according to Embodiment 3;
and
FIG. 8 are a side view (FIG. 8A) and a front view (FIG. 8B) each showing the structure of a spiral ring according to Embodiment 3.

MODE FOR CARRYING OUT THE INVENTION

Hereinafter, embodiments of a switchgear according to the present invention will be described in detail with reference to drawings. Incidentally, the present invention is not limited to the following description, but can be appropriately changed without departing from the spirit or scope of the present invention.

Embodiment 1

Figure 1:
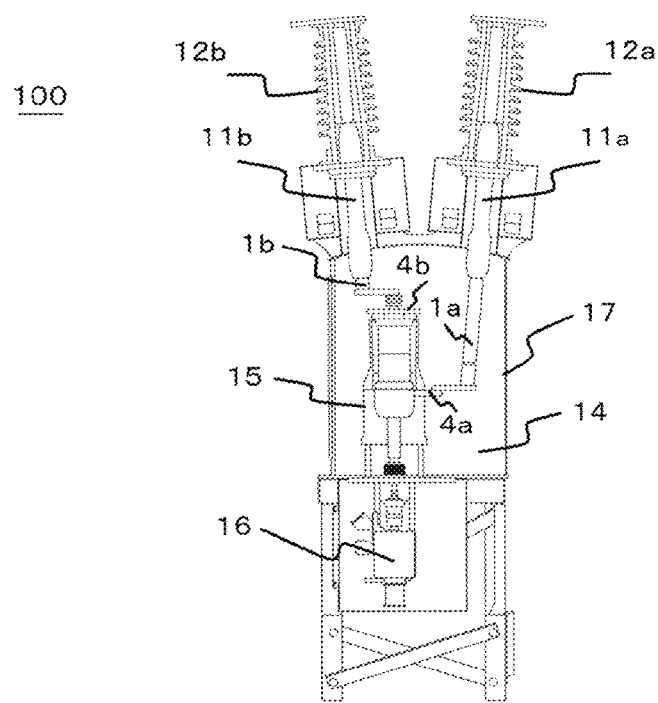
FIG. 1 is an overall view showing the structure of a switchgear according to the present invention.

FIG. 1 is a sectional view showing the schematic whole configuration of a switchgear including a circuit breaker. A switchgear 100 includes: a resin molded bushing 11, a porcelain tube 12, a vacuum interrupter 15, an electromagnetic operating mechanism 16, a housing (case) 17, and the like. The inside of the housing 17 is filled with insulating gas 14, such as sulfur hexafluoride (SF6) or dry air. The switchgear 100 includes a porcelain tube 12a and a porcelain tube 12b. A resin molded bushing 11a and a resin molded bushing 11b are inserted in the porcelain tube 12a and the porcelain tube 12b, respectively. An internal conductor (metal conductor) 1a of the resin molded bushing 11a is connected to a terminal conductor 4a of the vacuum interrupter 15. An internal conductor (metal conductor) 1b of the resin molded bushing 11b is connected to a terminal conductor 4b of the vacuum interrupter 15. The electromagnetic operating mechanism 16 performs switching control of a conductive state of the terminal conductor 4a and the terminal conductor 4b. The electromagnetic operating mechanism 16 operates by a switching control signal from the outside.

Figure 2:
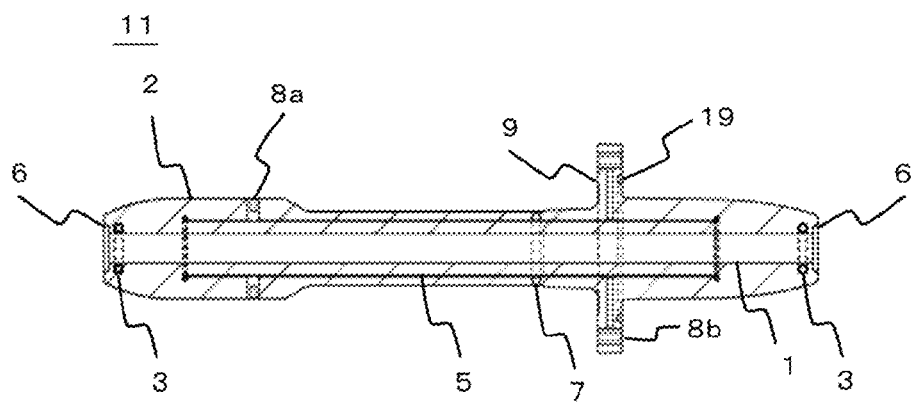
FIG. 2 is a view showing the structure of a resin molded bushing according to Embodiment 1.

FIG. 2 shows the structure of the resin molded bushing. The resin molded bushing 11 includes: an internal conductor 1, an insulating layer 2, an electric field relaxation shield 5, a spiral ring 7, a mounting flange 9, and the like. The internal conductor 1 having a columnar shape is made of copper or aluminum alloy. The insulating layer 2 made of insulating resin is casted so as to concentrically surround the internal conductor 1. A packing groove 19 is formed in an annular shape concentric with the internal conductor 1 on one surface (mounting surface to the housing) of the disk-shaped mounting flange 9. The packing groove 19 places a packing which is for sealing by maintaining airtight between the inside and the outside of the housing 17 in the radial direction of the resin molded bushing 11. The electric field relaxation shield 5 is embedded in the insulating layer 2. The insulating layer 2 is formed by casting resin, in which mold resin is injected in a mold tool. An embedded metal 8a and an embedded metal 8b, both of which are formed with fixing holes of the resin molded bushing 11, are fixed to outer peripheral portions near both side end portions of the electric field relaxation shield 5. The embedded metal 8b on the mounting flange side relates to joining to the housing 17 together with positioning of the electric field relaxation shield 5. The spiral ring (coil spring) 7 formed in a ring shape is fixed at a predetermined position by soldering on the outer periphery of the electric field relaxation shield 5.

A high voltage is applied to the internal conductor 1a and the internal conductor 1b. A triple junction portion 6 which comes in contact with three different types of materials (metal, solid insulating material, and gas) of the internal conductor 1, the insulating layer 2, and the insulating gas 14 is formed on a longitudinal end portion of the resin molded bushing 11. Local electric field concentration is generated near the triple junction portion 6 and accordingly insulation performance tends to deteriorate. An annular electric field relaxation ring 3 is mounted on the outer periphery of the internal conductor 1 for the purpose of achieving electric field relaxation near the triple junction portion 6. A garter spring is suitably used in the electric field relaxation ring 3. The garter spring is formed in a ring shape by connecting a continuation portion (nib portion). Normally, the outer diameter of the nib portion is finished slightly larger than the inner diameter of a body portion of the garter spring; and therefore, disengagement is not easily generated after assembly.

The structure of the electric field relaxation shield is shown in FIG. 3. The electric field relaxation shield 5 is made of copper or stainless steel mesh and controls the electric field inside the insulating layer 2 and outside the resin molded bushing 11. The electric field relaxation shield 5 is disposed, concentrically with the internal conductor 1, on the outer periphery of the internal conductor 1. The embedded metal 8a is directly joined to the electric field relaxation shield 5. The embedded metal 8b is joined to a tip end of a support bar 18 which is radially extended from the outer peripheral surface of the electric field relaxation shield 5. The spiral ring 7 is fixed to the outer periphery of the electric field relaxation shield 5. The position of the spiral ring 7 is preferable to be disposed at the center between the embedded metal 8a and the embedded metal 8b; however, in Embodiment 1, the position of the spiral ring 7 is located nearer to the mounting flange side in which a core deviation is likely to be generated due to the structure of a product.

FIG. 4 shows the structure of the ring-shaped spiral ring 7. The spiral ring 7 is formed in the ring shape (annular shape) by closing both ends of a contact coil spring. The ring-shaped spiral ring 7 is a spring body, thereby having elasticity in the radial direction or the longitudinal direction of the cross section of the spiral ring. In casting resin, in which the mold resin is injected, there is used a mold tool having an inner surface that is the same shape as the outer peripheral surface of the insulating layer 2. The spiral ring 7 comes in contact with the inner surface of the mold tool on an outer peripheral end portion thereof and comes in contact with an outer peripheral end of the electric field relaxation shield 5 on an inner peripheral end portion thereof to bias in the radial direction of the internal conductor 1; and thus, positioning of the electric field relaxation shield can be made. Positioning between the internal conductor 1 of the resin molded bushing and the electric field relaxation shield 5 is made by two embedded metals 8 and one spiral ring 7; and therefore, a structure is made such that the center deviation is not likely to be generated while absorbing a slight dimensional error in each direction or a dimensional error due to thermal expansion. Even if the spiral ring 7 is disposed on the electric field relaxation shield 5, special processing to the mold tool, adjustment work in assembling of the mold tool, and extra disassembling work of the mold tool are not needed. The spiral ring is merely disposed on the electric field relaxation shield; and therefore, mounting work can be made in a short time. Incidentally, the contact coil spring does not need to be completely closed to be the ring shape.

Figure 5:
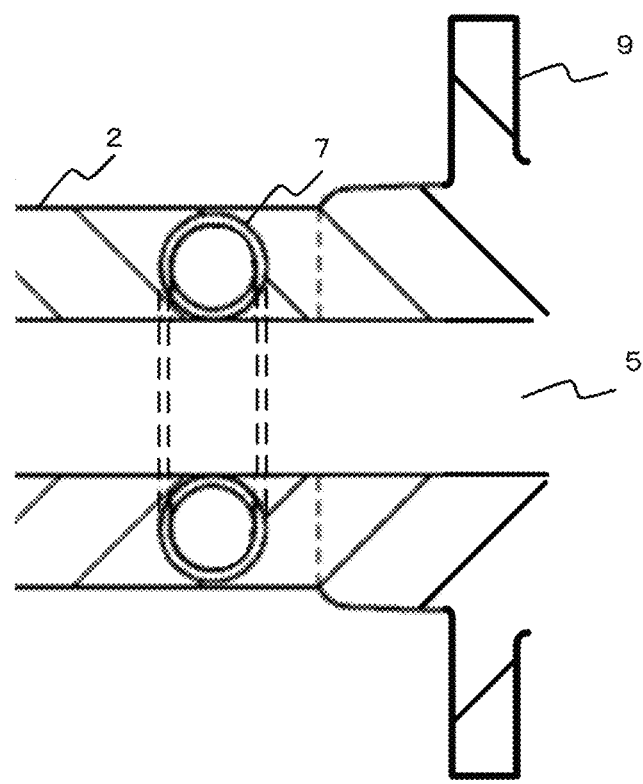
FIG. 5 is a sectional view showing the relationship between the spiral ring and the electric field relaxation shield.

FIG. 5 shows the relationship between the insulating layer and the spiral ring. The left side of the mounting flange 9 is of a nesting structure. A difference in level is formed in the thickness of resin on the left side of the spiral ring 7; and thus, the surface of the product is not damaged in drawing the nesting. In a method of mounting the spiral ring 7 on the electric field relaxation shield, there is also conceivable a method in which both ends of the contact coil spring are joined (welding, brazing, soldering, or the like) or a method of using the garter spring. It is preferable to select the coil diameter of the spiral ring 7 substantially corresponding to the resin thickness (that is, the distance between the inner surface of the mold tool and the outer peripheral surface of the electric field relaxation shield 5) of the insulating layer 2. Incidentally, in this case, the spiral ring 7 is fixed on the outer periphery of the electric field relaxation shield 5 by soldering. However, the ring-shaped spiral ring 7 is not fixed by soldering or the like, but may be made to come in contact with the outer periphery of the electric field relaxation shield 5 to perform positioning by the contraction force of the spiral ring 7.

Embodiment 2

Figure 6:
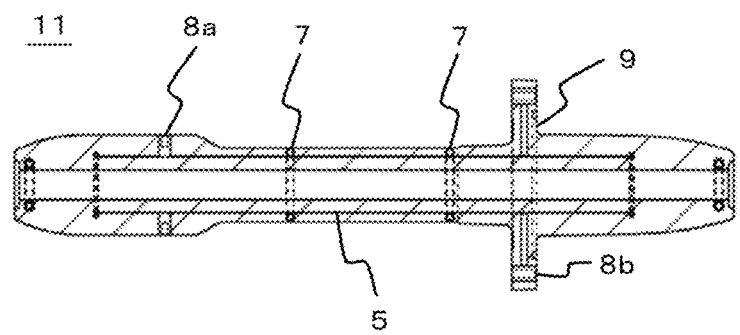
FIG. 6 is a view showing the structure of a resin molded bushing according to Embodiment 2.

FIG. 6 shows Embodiment 2 of the present invention. Two ring-shaped spiral rings 7 are disposed keeping intervals on an electric field relaxation shield. The spiral rings 7 are disposed at plural places according to the structure of a resin molded bushing; and thus, fixing places are increased to be a structure in which a center deviation is not further likely to be generated. Combination use with the conventional fixing method is also easy and it can deal with various fixing methods by combining methods.

Embodiment 3

Embodiment 3 according to the present invention will be described with reference to FIG. 7 and FIG. 8. In Embodiment 3, circular arc-shaped and short spiral rings 7a to 7c are disposed in a ring shape on the outer periphery of an electric field relaxation shield 5. A plurality of the spiral rings 7a to 7c which are disposed in the circular arc-like shape exhibit a function equivalent to that of a ring-shaped spiral ring. Three spiral rings are disposed in the circular arc-like shape on the outer periphery of the electric field relaxation shield 5; and thus, a structure is made such that the spiral rings are not disposed at places corresponding to an upper portion of a cast mold tool.

The short spiral ring uses, for example, a contact coil spring having a length about one-sixth as long as the outer peripheral length of the electric field relaxation shield. Respective both ends of the spiral rings 7a to 7c are fixed to the electric field relaxation shield 5 by a method such as welding. According to Embodiment 3, the contact coil springs are disposed so that the spiral rings do not come in contact with the upper surface of the mold tool for use in casting; and thus, air (void) is not remained in a spiral ring portion when resin is injected in the mold tool by casting.

In the aforementioned embodiments, the description has been made on examples of using the spiral ring 7 whose coil spring is formed in the annular shape. However, even when there intervenes an elastic member like extending in a waveform in the circumferential direction of the electric field relaxation shield 5 while alternately coming in contact with the inner peripheral surface of the mold tool and the outer peripheral surface of the electric field relaxation shield 5, an effect equivalent to that of the aforementioned embodiments can be obtained. Other than those above, there can be obtained an effect equivalent to that of the aforementioned embodiments, even when there intervenes a heat resistant elastic member which is resistant to resin cast temperature and can apply a biasing force between the inner surface of the mold tool and the outer peripheral surface of the electric field relaxation shield 5 in the radial direction of an internal conductor. Furthermore, the description has been made on examples of the electric field relaxation shield 5 as an object to be retained; however, if the object to be retained is a member required to be retained at a predetermined position concentric with the internal conductor, an effect equivalent to that of the aforementioned embodiments can be obtained.

Incidentally, the present invention can freely combine the embodiments and appropriately change or omit the respective embodiments, within the scope of the present invention.

INDUSTRIAL APPLICABILITY

The present invention relates to an electric field relaxation shield of a resin molded bushing to be equipped in a switchgear and/or a circuit breaker.

DESCRIPTION OF REFERENCE NUMERALS

1. Internal conductor,
2. Insulating layer,
3. Electric field relaxation ring,
4. Terminal conductor,
5. Electric field relaxation shield,
6. Triple junction portion,
7. Spiral ring,
8. Embedded metal,
9. Mounting flange,
11. Resin molded bushing,
12. Porcelain tube,
14. Insulating gas,
15. Vacuum interrupter,
16. Electromagnetic operating mechanism,
17. Housing,
18. Support bar,
19. Packing groove, and
100. Switchgear.

The invention claimed is:

1. A resin molded bushing comprising:
an electric field relaxation shield which concentrically surrounds the outer periphery of an internal conductor made of conductor;
a cast resin which covers said internal conductor and said electric field relaxation shield; and
an elastic member which is disposed on the outer periphery of said electric field relaxation shield and is embedded in said cast resin,
wherein the height of said elastic member is equal to the thickness of said cast resin at the location where the elastic member is provided in the cast resin.

2. The resin molded bushing according to claim 1, wherein said elastic member is made of a coil spring.

3. The resin molded bushing according to claim 2, wherein said coil spring has a ring shape whose both ends are closed.

4. The resin molded bushing according to claim 3, wherein said coil spring having the ring shape is arranged in plural numbers on the outer periphery of said electric field relaxation shield keeping intervals with each other in the axial direction of said electric field relaxation shield.

5. The resin molded bushing according to claim 2, wherein said coil spring is arranged in plural numbers on the outer periphery of said electric field relaxation shield; and
the plurality of said coil springs are disposed on the same circumference on the outer periphery of said electric field relaxation shield.

6. A switchgear comprising:
the resin molded bushing according to claim 1;
a vacuum interrupter which is placed in a housing and to which said internal conductor of said resin molded bushing is connected; and
an operating mechanism which controls an opening-closing state of said vacuum interrupter.

7. The resin molded bushing according to claim 1, wherein the elastic member is attached to an outermost surface of the electric field relaxation shield.

8. The resin molded bushing according to claim 1, wherein the electric field relaxation shield extends along a majority of the length of the internal conductor.

* * * * *